United States Patent
Partovi et al.

(10) Patent No.: US 9,305,119 B1
(45) Date of Patent: Apr. 5, 2016

(54) SYSTEM, APPARATUS AND METHOD FOR DETERMINING CORRECT METADATA FROM COMMUNITY-SUBMITTED DATA

(75) Inventors: Hadi Partovi, Seattle, WA (US); Yevgeny Zarakhovsky, Seattle, WA (US); Nathaniel Scott Brown, Seattle, WA (US)

(73) Assignee: MYSPACE LLC, Beverly Hills, CA (US)

( * ) Notice: Subject to any disclaimer, the term of this patent is extended or adjusted under 35 U.S.C. 154(b) by 1212 days.

(21) Appl. No.: 11/831,669

(22) Filed: Jul. 31, 2007

Related U.S. Application Data

(60) Provisional application No. 60/869,994, filed on Dec. 14, 2006.

(51) Int. Cl.
*G06F 17/30* (2006.01)

(52) U.S. Cl.
CPC ........ *G06F 17/30997* (2013.01); *G06F 17/301* (2013.01); *G06F 17/30038* (2013.01); *G06F 17/30749* (2013.01)

(58) Field of Classification Search
CPC ............ G06F 17/30997; G06F 17/301; G06F 17/30038; G06F 17/30749; G06F 17/30616
USPC .......................................................... 707/3
See application file for complete search history.

(56) References Cited

U.S. PATENT DOCUMENTS

| | | | | |
|---|---|---|---|---|
| 7,707,221 | B1 * | 4/2010 | Dunning | G06F 17/30743 707/770 |
| 8,086,758 | B1 * | 12/2011 | Allan | G06F 9/541 370/352 |
| 8,346,789 | B2 * | 1/2013 | Klein, Jr. | G06F 17/30038 707/758 |
| 8,495,075 | B2 * | 7/2013 | Miller | G06F 17/30023 707/758 |
| 2003/0093790 | A1 * | 5/2003 | Logan | G06F 17/30265 725/38 |
| 2004/0002993 | A1 * | 1/2004 | Toussaint | G06F 17/30038 |
| 2005/0055372 | A1 * | 3/2005 | Springer et al. | 707/104.1 |
| 2006/0004914 | A1 * | 1/2006 | Kelly et al. | 709/219 |
| 2006/0253207 | A1 * | 11/2006 | Jaffray | G06F 17/30743 700/94 |
| 2007/0033229 | A1 * | 2/2007 | Fassett | G06F 17/30749 |
| 2007/0199022 | A1 * | 8/2007 | Moshiri | H04N 5/44513 725/39 |

* cited by examiner

*Primary Examiner* — Daniel Kinsaul
(74) *Attorney, Agent, or Firm* — Gates & Cooper LLP

(57) ABSTRACT

A system, apparatus, and method for processing or correcting metadata used to characterize content such as images, video, books, or music, where that metadata may be provided by a community of users or other source. The metadata may be searched as part of a process of identifying and accessing content of interest to a user or of sharing content among users of a network. The metadata is typically a string or strings of characters that is submitted by a community, so that the accuracy of specific data cannot be guaranteed and consistent formats and unambiguous descriptions may not be used by all members of the community.

20 Claims, 8 Drawing Sheets

SYSTEM, APPARATUS AND METHOD FOR DETERMINING CORRECT METADATA FROM COMMUNITY-SUBMITTED DATA

CROSS REFERENCE TO RELATED APPLICATION

This application claims the benefit of U.S. Provisional Application No. 60/869,994, filed Dec. 14, 2006, the contents of which are incorporated herein.

BACKGROUND

The present invention is directed to systems, apparatus and methods for correcting data or resolving ambiguities in data, and more specifically, to correcting metadata used to describe content that is submitted by a relevant community or network of users.

The growth of the Internet and the availability of high speed communications networks have contributed to a growing interest among users in the creation and sharing of digital content. This content may take the form of images, books, videos, or sound files (such as music), for example. Some of the content may be created by a user and shared with others in a network of users, while some content may be commercially available and uploaded to the Internet for access and distribution to others via a downloading process. In either case, the content is typically described using metadata such as title, artist or creator, source, version, description of content, etc. A person seeking the content typically enters examples of such metadata as keywords into a search engine and then examines the results of the search to find the content they desire.

The metadata used to characterize the content typically takes the form of one or more strings of characters which form a data n-tuple, where the characters may include letters, numbers, and standard typographic symbols (e.g., #, &, -). A problem may arise because while the categories of metadata may be standardized (e.g., title and artist for music content), some or all of the metadata used to describe the content may be ambiguous, contain spelling errors, or represent one of several generally accepted or understood ways of describing the same information. For example, even a well-known musical group such as "The Beatles" may be entered as an artist name in multiple forms; Beatles, Beetles, Beatles, The, etc. While this example is rather simple, it illustrates that there are multiple possible forms that metadata may take for even well-known and familiar categories of metadata. Although this example introduces a recognizable spelling error and a limited amount of ambiguity as to what is meant, it may still cause problems for certain types of consumer applications. Such applications include, for example, those whose reliability or utility to a user are highly dependent upon exact matching of metadata search terms.

One of the problems created by variations in the metadata used to describe content is that of efficiently enabling the search of, retrieval, and distribution of digital content such as images, videos, books, and music when that content is described by potentially incorrect, misspelled, or ambiguous metadata. This problem is made even greater by the growth and use of social networks for sharing content. This is because such networks enable users to search content in the content libraries of multiple users, where each such user may have contributed incorrect, misspelled or ambiguous metadata to the description of that content. As a result, as the number of users increases, both the potential variations in the way that content is characterized and the resulting metadata errors are likely to increase.

Thus, from one perspective, "dirty metadata" is or may become a problem in many consumer internet multimedia applications, where in the context of the present invention, "dirty metadata" includes, but is not limited to, incorrect, misspelled, ambiguous, or simply confusing data that is meant to characterize or describe some aspect of content or other data. As discussed, in music-related services, misspelled, ambiguous, or missing metadata information may cause confusion about the identity of an artist, song or album that is being searched for or recommended. In video or image related searches, finding a desired video or image is made more difficult in the situation where multiple videos or images are returned as a match to the search parameters (where the search parameters are typically used to identify the subject matter or characteristics of the desired content, or as data used to otherwise describe the image or video). In this type of search (as well as others) a user would prefer to reduce the number of unique "hits" that result from the search by having incorrect metadata corrected so that search results are more relevant and not duplicative, and metadata more accurately reflects the actual content.

As a further example, most consumers with digital music libraries (e.g., iTunes™ distributed by Apple™) have "dirty" metadata in their music libraries—misspelled artist names or track names, missing or incorrect track, album, or genre information, etc. The flawed metadata can cause problems when trying to manage one's music, for example in finding a favorite song whose name is misspelled in the library, creating a playlist (manually or automatically) when the tracks in the playlist aren't labeled properly, or trying to receive recommendations for new music from other members of a network when the original music isn't properly labeled or identified (or at least identified in an unambiguous manner).

As noted, these problems are particularly troublesome in social networks or Internet services involving posting of multimedia content or sharing, because such networks combine the dirty metadata of multiple users in one place. This means not only that the volume of incorrect metadata is greater, but also the possible variations in that metadata. As an example, on the video service YouTube (now part of Google™), a popular video may be uploaded to the YouTube service many times by different consumers, and when searching for the video the same search may yield multiple, possibly equivalent results. This creates a burden on the user to determine which video is the best to watch to satisfy their interests, or to otherwise filter the search results. Within the music space, there are numerous potential social networking applications or services that add value for users but that are either impossible or cannot be implemented in an optimal or desirable way without proper metadata. For example, sharing music playlists between two users is only realistic and desirable if the person sharing the playlist has proper metadata (to describe the music in the playlist), and the person receiving the playlist has similarly proper metadata (to know which songs from the playlist he/she already owns).

Although the problem of using incorrect or ambiguous metadata to describe content has been recognized, at present there is not a satisfactory solution to the problem. One possible solution that has been suggested is to compare the "dirty" metadata to a "known good database" of metadata, and then to correct misspellings based on the accepted "known good" spellings. In this regard, the most widely used application/service that performs this correction based on accepted good metadata is the Windows Media Player (WMP) from Microsoft™, coupled with a service known as the Windows Media Internet Service (WMIS) metadata service. This combination can be used to correct metadata because the Windows Media Player has the capability of looking at every media item in a consumer's digital library. The WMP then transfers the relevant metadata to the WMIS service, where a server-side spellchecking algorithm compares that metadata to a large database of "known good metadata". The output of the service is properly-spelled metadata which is returned to the user and used to correct misspellings in the user's media library. For example, a consumer may have a digitized song labeled with the artist name "Brittany Spears"; in this case the WMP will send the artist name to the WMIS service, which identifies it as a misspelling by comparing it to a database which provides the proper spelling, i.e., "Britney Spears".

However, as recognized by the inventors of the present invention, there are at least two primary problems with such a solution to the dirty or incorrect metadata problem:

(1) It is very difficult, perhaps even unrealistic or impossible, to build a comprehensive, up-to-date, and correct "known good database" of metadata. This is at least partly because building such a database requires licensing data from multiple providers—music labels, music publishers, and $3^{rd}$ party data aggregators. Each of these sub-providers may have errors in their own data, and they may provide different, conflicting spellings for the same media or content. Furthermore, keeping a "known good" database up-to-date in a timely fashion requires regular (if not continuous) freshening of data, again in reliance on multiple $3^{rd}$ parties. Thus, building such a database and keeping the data fresh in a scalable fashion in the growing world of multimedia is very difficult and may be an unrealistic goal; and (2) In the world of music, movies, and video, a given author or work may have multiple, commonly known spellings or versions of the artist's name or title of a particular work. For example, "Beatles", "The Beatles", "beatles", and "Beatles, The" are all common ways to attribute music to the band most properly called "The Beatles". Similarly, the artist "Beyoncé" is often spelled as "Beyonce" without the accent, and the group "Mötley Crüe" is often spelled as "Motley Crue", without the umlaut. The use of multiple forms for the metadata describing the same underlying data can create further uncertainty as to what information or content is being referenced, and thereby complicate or in some situations frustrate a user's ability to find, retrieve, or share content.

What is desired is a system, apparatus and method for correcting metadata used to characterize content that is submitted by a community of users, where such system, apparatus, and method overcomes the noted disadvantages of existing approaches.

BRIEF SUMMARY

In some embodiments, the present invention is directed to systems, apparatus, and methods for processing or correcting metadata used to characterize content such as images, video, books, or music, where that metadata may be provided by a community of users or other source. The metadata may be searched as part of a process of identifying and accessing content of interest to a user or of sharing content among users of a network. Some embodiments of the present invention are applicable to consumer multimedia applications and services, and the management of multimedia metadata within such applications and services to provide search, content retrieval, content management, and similar functions. A further example of a possible use of the invention is the correction of network accessible metadata used to characterize music, images, movies, or books to enable more effective sharing of content via a recommendation or other process. In such cases the metadata is typically a string or strings of characters and the metadata is submitted by a community, so that the accuracy of specific data cannot be guaranteed and consistent formats and unambiguous descriptions may not be used by all members of the community.

In some embodiments of the invention, metadata describing content is accessed in the form of an n-tuple of data, with the data typically being one or more strings composed of alphanumeric characters and common typographic symbols. An example would be an n-tuple comprised of a song's artist, title, album source, and genre. The n-tuple may first be compared to previously input and stored metadata. If the n-tuple has already been input to the system and associated with a standardized or canonical form, then that form is used for the further processing of the metadata. Such further processing may include determining the "preferred", "best" or most popular metadata corresponding to that standardized or canonical form, and then using that "preferred", "best" or most popular metadata for further processing, such as to provide recommendations or identify a desired source for the content.

If the n-tuple has not already been associated with a standardized or canonical form, then a canonicalization process or set of processes is applied to the metadata. This process or set of processes are intended to reduce or convert the metadata to a form in which it may more easily and accurately be compared to other metadata, either as initially input or after application of the canonicalization process to the other metadata. The same canonical form may result from application of the canonicalization process to one or more than one metadata string. Further, each metadata string may have an associated frequency of occurrence, popularity, or other metric associated with the data. In some embodiments, for each canonical form, the inventive process determines the unprocessed metadata having the highest metric value that resulted in the canonical form after application of the canonicalization process to that unprocessed metadata.

The form of unprocessed metadata having the highest metric value is then selected as the "preferred", "correct", or "best" metadata and the canonical form is mapped to or associated with that "correct" metadata. This causes all other metadata that resulted in (or in future applications of the canonicalization process, may result in) the same canonical form to be mapped to that "correct" metadata through the intermediary of the canonical form. The "correct" metadata is then used for applications or services in which metadata is searched or compared to determine content of interest, produce recommendations, etc.

Further, in some embodiments, in addition to this type of data processing, the inventive system may also use contextually relevant information to process the raw metadata or canonical forms to further reduce errors and ambiguities. For example, as metadata is processed it is possible that multiple canonical forms for the same content will be generated. These forms can be processed using contextually relevant information to correct misspellings, ambiguities or other errors, followed by re-mapping the incorrect canonical or metadata forms to the correct or desired ones. Such re-mapping may be performed automatically in accordance with a set of rules or conditions, or may be performed by a user of the system as a result of a manual process.

In one embodiment, the present invention is directed to a method of processing a plurality of metadata used to characterize content and includes accessing the plurality of metadata, processing the plurality of metadata to produce a canonical form, associating the canonical form with one of the plurality of metadata where the one of the plurality of metadata having an associated metric value, and utilizing the one of the plurality of metadata as an input in a data processing operation.

Other objects and advantages of the present invention will be apparent to one of ordinary skill in the art upon review of the detailed description of the present invention.

DETAILED DESCRIPTION

In some embodiments, the present invention is directed to systems, apparatus, and methods for processing incorrect or ambiguous metadata, where that metadata is used to characterize content. The content is typically digital content, such as music, images, video, electronic books, or similar content. In some embodiments, the inventive system utilizes a combination of heuristics and rules to identify metadata referring to content that is potentially the same, and then uses a popularity measure or other metric to determine the best estimate of the correct metadata, that is, the most likely correct metadata for that category or content.

Although the present invention will be described with reference to example embodiments, it is noted that practice of the invention is not limited to those embodiments. For example, the content may be audio, video, animation, images, or other forms of multimedia. The metadata may be in the form of a string or strings of alphanumeric characters, although others forms or formats of data may be used. The data structure used to store and organize the metadata and results of the inventive processes may be the database form described herein, although other forms of data structures such as data trees, node-based models, etc. may also be used. The data processing operations may be performed real-time as data is acquired, as part of a background operation, or a combination of these methods. The data processing operations may be performed locally and the results communicated over a network to a centralized data processing and storage element, or remotely by a computing device connected to the data sources over a network. Further, although certain elements of the inventive system may be depicted as residing in a server or servers, or connected by means of a network or networks, such elements may be separate from one another, or combined, and connected as desired to implement the functions and processes of the invention.

Figure 1:
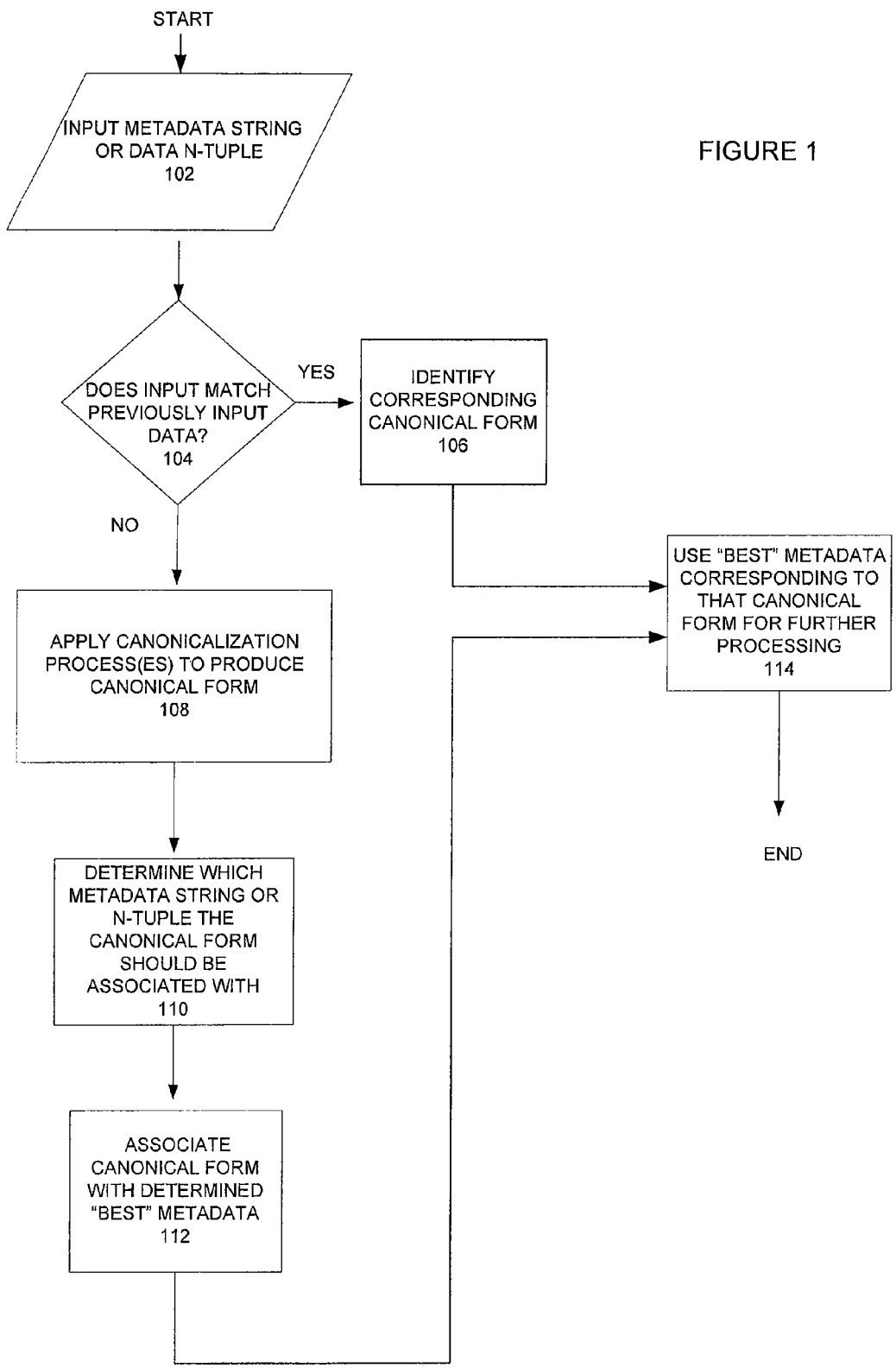
FIG. 1 is a flowchart illustrating a process for reducing errors or ambiguities in metadata used to describe content, in accordance with some embodiments of the present invention.

FIG. 1 is a flowchart illustrating a process 100 for reducing errors or ambiguities in metadata used to describe content, in accordance with some embodiments of the present invention. As shown in the figure, in some embodiments the process starts with the input of a metadata string or data n-tuple (stage 102). In the context of the present invention, such input data may take the form of a sequence of alphanumeric symbols, characters and/or typographic symbols, or a set or group of such strings. For example, one possible form for the input data is:

($\alpha_i$ (where i=1, ..., n); $\beta_i$ (where i=1, ..., n); $\gamma_i$ (where i=1, ... n)), where $\alpha_i$, $\beta_i$, and $\gamma_i$ represent data tuples with each data tuple comprised of a string of characters. If the input data is for a song, for example, the n-tuple may represent the artist name ($\alpha_i$), album name ($\beta_i$), and song name ($\gamma_i$), where each string may contain a variety of spellings, errors or ambiguities. The inventive system and methods may process input data in real-time as needed for a particular application or service, or in the background to generate corrected metadata for later use. The input metadata may be provided from one or more possible sources, including but not limited to, content libraries of users, an application that "plays" the content and provides a record of content being played to the system, a secondary source such as a content aggregator, a database of known good data, etc. The input metadata may be provided to the inventive processing system a single field or data tuple at a time or as a group of related data tuples, and the input data may be processed as individual data tuples or as a group of one or more data tuples. By processing the input data as a group or set of more than one data tuple, the inventive system may achieve efficiencies or improved results because of information provided by the contextual relationship between the data tuples.

The input data is first checked to determine if it matches previously input and stored metadata (stage 104). If it does match previously input data, then that data will have already been processed to determine the corresponding canonical form for that data, and such form may be identified (stage 106). Further, in accordance with some embodiments of the invention, the identified canonical form will be associated with a corresponding "preferred" or "best" set of input metadata (the determination of which will be described further with reference to the figure) and that "best" input metadata will be used for further processing of the originally input metadata in other applications or services, such as to retrieve content, construct a play list, share content, provide a recommendation, etc. (stage 114).

If the input metadata does not match previously input data, then a canonicalization process or processes are applied to the input data (stage 108). The canonicalization process or processes are used to reduce or convert the input metadata to a standardized or canonical form in which it may more efficiently be compared to other data. The process or processes applied to the data may take a generic form applied broadly to the input data, or be specific to the data being processed (such as based on the type, format, or some characteristic of the data). In some embodiments of the invention, the canonicalization process takes the form of a function Canonical Form=Output of $F(x)$, where $F(x)$=canonicalize($x$) and $x$ is the input data.

One purpose of introducing a standardized or canonical form is to reduce the number of possible variations in the metadata to a smaller number of representative forms. However, to do this effectively, the canonicalization process should be constructed or defined so as to not introduce additional ambiguity, i.e., it should be subject to certain constraints or limitations.

For example, one approach is to construct the canonicalization process so that the output of the process is generally recognizable as corresponding to the input, i.e., to only apply rules or processes that do not alter the basic meaning of the data. Another approach is to constrain the number of canonical forms that may be produced (and thereby assist in reducing the errors or ambiguities in the metadata), by introducing knowledge about the data, its formats and possible variations in the form of a condition/requirement that for a string x, $F(x)=F(x_1)=F(x_2)=F(x_n)$, where $x_1, x_2, \ldots x_n$ represent strings that satisfy a relationship or represent examples of inputs that are desired or intended to be converted, reduced, or mapped to the same canonical form. As an example, if several forms of metadata for an artist or author are known to represent the same artist or author (e.g., "Beatles", "The Beatles", Beatles, The", "beatles", "beatles, the"), then this knowledge should be introduced into the process so that the canonicalization function operates to produce the same output for all such forms of input data. Similarly, capitalization, accents, spaces, the ampersand symbol (&), and certain words or phrases (e.g, "and", "the", "a") may be removed or altered without loss of meaning or increasing ambiguity. As an example, canonicalize ("Mötley Crüe") should provide the same output as canonicalize ("motley crue"). Based on these observations, a canonicalization heuristic, rule set, algorithm or process may be defined, along with a condition or conditions of the form noted. As an example, a possible canonicalization process could take the form of a set of rules or operations such as:

Convert all accented/umlaut/etc characters into the closest English alphabet counterparts;
Replace all instances of '&' with 'and';
Remove any leading or trailing articles such as 'a' and 'the';
Convert all characters to lowercase; and
Strip all remaining non-alphanumeric characters.

Note that this is merely one example of a possible canonicalization process and as with other possible processes, it may be "tuned" or otherwise adjusted by testing its operation against a set of inputs whose outputs have a desired relationship. Another possible canonicalization algorithm or process would be to convert the words in a data string into 'phonemes', i.e. language specific symbols describing the sounds in the string. In such processing the phonemes are used as a basis set to which more complex data is reduced for ease in comparison. Yet another possible process would be to separately canonicalize the individual words in the string, and then sort them alphabetically prior to further analysis. Note that in one sense, a goal of the canonicalization process is to operate on input data to map multiple forms of input data to the same output, subject to constraints based on knowledge of which forms of input data should be taken to represent the same information, and hence be reduced to a common canonical form. Note that generic canonicalization or data reduction processes that satisfy this goal and function as desired for the operation of the invention would be suitable in implementing some embodiments of the invention.

After application of the canonicalization process to the input data, the resulting output is termed a canonical form. Note that as a result of applying the canonicalization process to a set or group of inputs, multiple inputs may be mapped to the same output (this is in fact a desirable aspect of the process). Further, each of those inputs may have an associated value, metric, frequency of occurrence, popularity measure, or other relevant measure that may be used to compare or order the inputs. The inventive method next determines which, of the forms of the input data that produced a common canonical form, that form should be associated with, based on the value, metric, etc. (stage 110). This association, linking, mapping or similar operation serves to replace multiple input forms of the metadata with a single form of metadata that is taken to represent the "preferred", "best", or "correct" form for the information represented by that metadata, via the intermediary of the canonical form. This sequence of steps or stages may be represented as:

map multiple inputs to canonical form→map canonical form back to single "best" input.

As mentioned, the process of determining the "preferred", "best", "correct" or otherwise described input form that the canonical form is mapped to or associated with may be based on one or more metrics, measures, or the like. Examples include frequency of occurrence (so that the most common form of the input is adopted as the "preferred", "best", or "correct" form), popularity among members of a defined network (so that the form suggested by the greatest number of individual members is selected), a weighted sum of factors such as usage of a form by members of a social network having some indicia of reliability (such as a high number of previously accepted forms of metadata), a form having certain attributes or lacking certain attributes, etc.

After determination of the "preferred", "best", or "correct" metadata, the canonical form is associated with that metadata (stage 112). This association may be implemented by creation of a pointer in a database between the canonical form and the "preferred", "best", or "correct" metadata, or by another suitable operation. However accomplished, the association is intended to cause further operations that would utilize the metadata forms that are mapped or reduced to the canonical form to instead use the "preferred", "best", or "correct" form of the metadata which the canonical form is associated with (stage 114). As will be described, these operations include applications and services such as search and presentation of search results, recommendations, comparisons of play lists or content libraries between members of a network, etc.

Figure 2:
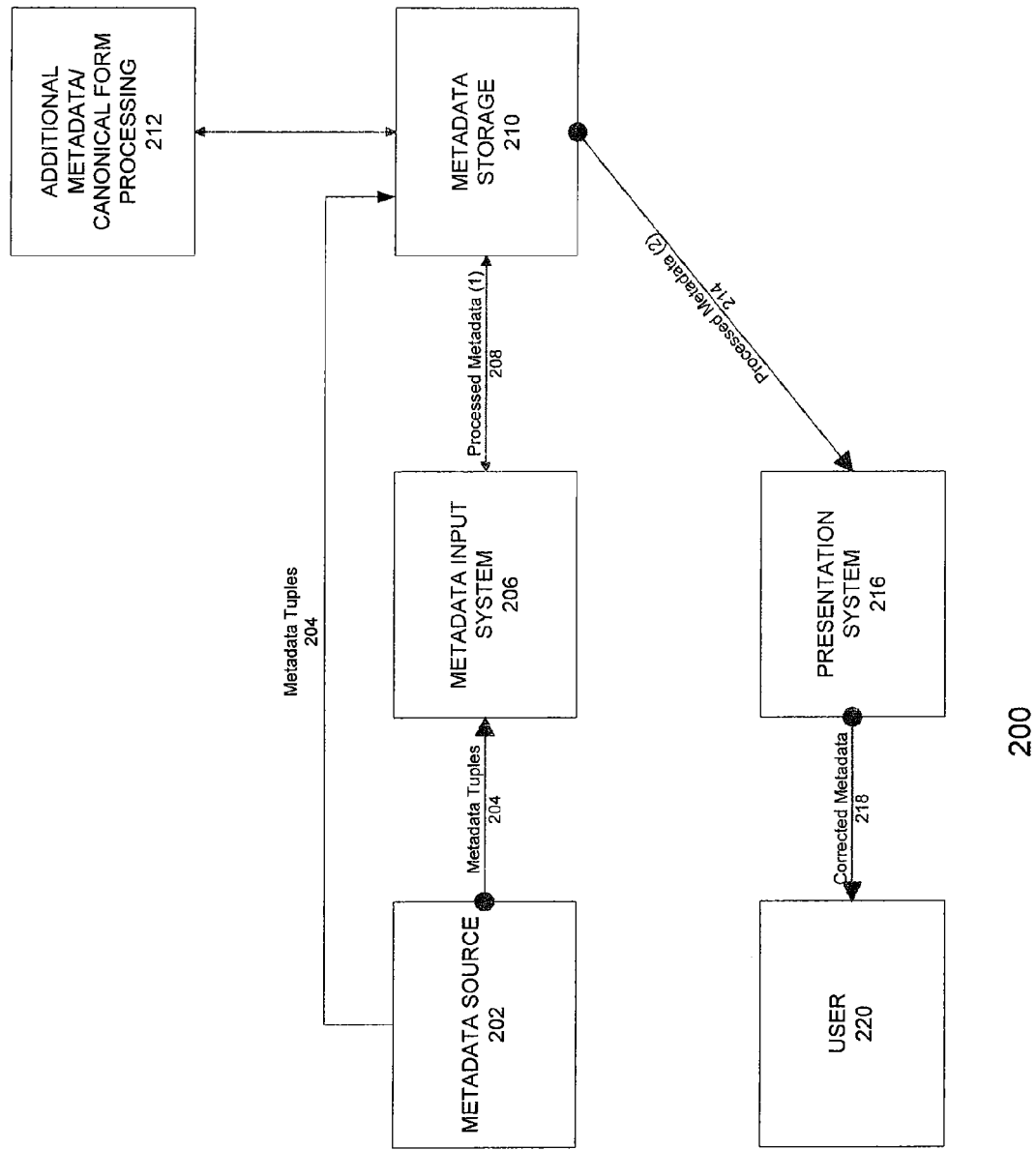
FIG. 2 is a functional block diagram of a system for reducing errors or ambiguities in metadata used to describe content, in accordance with some embodiments of the present invention.

FIG. 2 is a functional block diagram of a system for reducing errors or ambiguities in metadata used to describe content, in accordance with some embodiments of the present invention. As shown in the figure, system 200 includes metadata source 202, which may be a user or owner of the content (such as a member of a social network), a 3rd party supplier of content or metadata, or another source of content or metadata. The metadata provided by source 202 is typically provided in the form of data-tuples 204, although this form is not required for practice of the present invention. The metadata 204 obtained from source 202 is input to metadata input system element 206, which performs initial processing of the metadata 204. The initial processing includes, but may not be limited to, application of one or more rules or heuristics designed to reduce the input metadata to a canonical form. As described with reference to FIG. 1, one purpose of this stage of the processing is to convert or reduce the possible variations in the input metadata to a smaller number of representative forms to which most reasonable variations can be mapped. This effectively reduces the complexity of the search and/or mapping problem because a relatively large number of variations in the strings of metadata can be reduced to a relatively smaller number of forms (or even a single form) which can then be used as part of processing search requests, retrieving content, making recommendations, and providing other valuable services.

An output of the processing performed by metadata input system 206 is processed metadata (1) 208, which is stored in its canonical form or forms in metadata storage element 210. Note that processed metadata (1) 208 represents one form of processed metadata that may be generated by the inventive system 200, and that storage element 210 also stores the raw metadata 204 obtained from metadata source 202. Storage element 210 may include pointers or links between the raw metadata and the corresponding canonical form or forms to which the raw data is converted or mapped. Note that as discussed, in a typical situation, multiple examples or forms of raw metadata may be mapped to the same canonical form. In some embodiments, storage element 210 may be a relational or other form of database structured to provide links between data types, where those data types include raw metadata strings, processed metadata, or canonical forms, and the data may be stored in tables, files, or other suitable format.

In addition to the determination of a canonical form or forms for the input metadata, metadata input system 206 also determines which of the raw metadata mapped to a specific canonical value or form represents the raw metadata that should be used for further processing of search requests, content retrieval, recommendations, or other processing that provides content-related services. In the context of the present invention, the specific raw metadata that will be associated with the canonical form and used for further processing is termed the "preferred", "best", or "correct" form of that metadata. It is to be understood that determination of the "preferred", "best", or "correct" metadata may require additional processing and may be implemented using one or more rules, heuristics, algorithms or measures that act to determine which potential candidate metadata should be accepted as the best or most accurate representation of the information mapped to each canonical form. In response to such determination, the inventive system maps or links the canonical form back to that "preferred", "best", or "correct" metadata. Thus, metadata storage 210 may contain raw metadata as provided by metadata source 202, canonical form or forms of that metadata, pointers or associations between the raw metadata and the corresponding canonical form, and a pointer back from a canonical form to the "preferred", "best", or "correct" raw metadata. Further details regarding the structure of the storage element or database, data formats, data schema, and associations between the data stored in the element will be described with reference to FIG. 5.

In addition to the data processing described, system 200 may also include additional processing stages 212 that act on the metadata and/or canonical forms stored in storage element 210, where these processing stages 212 may be used to reduce ambiguities in the data, perform spelling correction, incorporate contextual knowledge about the data or forms it may take, or otherwise process the data to assist in providing desired services. Examples of such additional processing will be described with reference to FIGS. 6-7, although it is to be understood that such additional processing is not limited to the processes described with reference to those Figures, nor to the manner in which those processes are described as being implemented.

In some applications of using metadata to describe or otherwise characterize content, a user 220 may be interested in a display of the processed metadata. In such situations, the system 200 may include presentation system 216 which is capable of accessing metadata storage 210 and providing processed metadata (2) 214 to user 220. Note that processed metadata (2) 214 may or may not differ from processed metadata (1) 208 depending upon whether additional metadata and/or canonical form processing has occurred. Presentation system 216 may include, but does not require, and may not be limited to, processes or methods that access metadata storage 210 and process, format, or otherwise act on data stored therein to provide the "preferred", "best", or "correct" metadata 218 (and/or the result of using such metadata to perform some operation) to user 220 by means of an application programming interface (API), user interface, web-page, messaging system, etc. Note that as metadata is input to and processed by system 200, the specific metadata that is presented to a user may change as a result of the determination of a different "preferred", "best", or "correct" form of the metadata.

Figure 3:
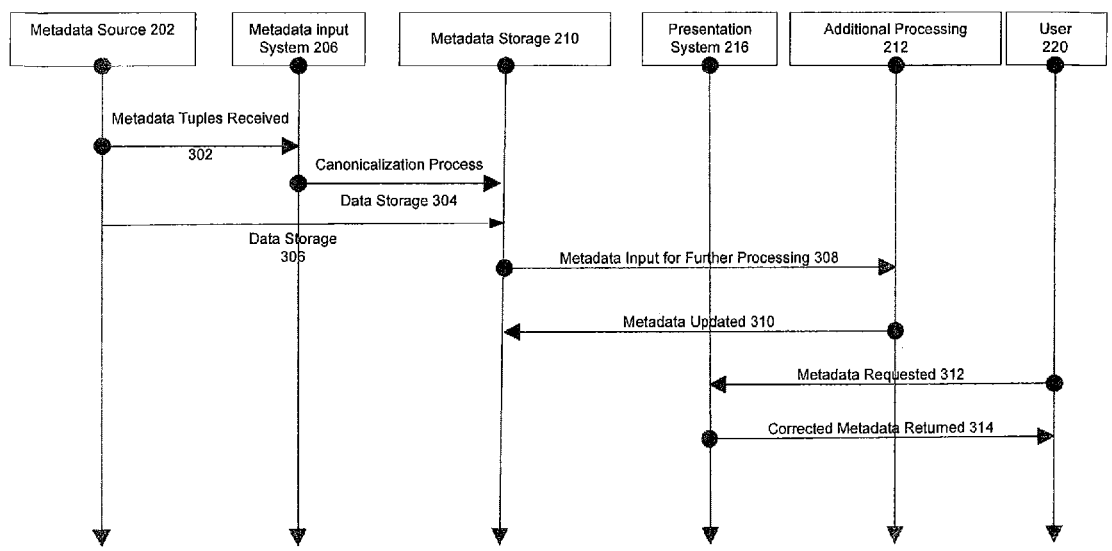
FIG. 3 is a flow diagram depicting the data flow for an example process for reducing errors or ambiguities in metadata used to characterize content in accordance with some embodiments of the present invention.

FIG. 3 is a flow diagram depicting the data flow 300 for an example process for reducing errors or ambiguities in metadata used to characterize content in accordance with some embodiments of the present invention. The data flow described with reference to FIG. 3 generally follows that involved in the data processing described with reference to FIG. 2, but is not limited to such processing. As shown in FIG. 3, metadata n-tuples are received from metadata source 202 and provided to metadata input system 206 (stage 302). The metadata n-tuples represent the raw metadata input to and processed by the inventive system. Metadata input system 206 performs data processing on the input metadata, including one or more canonicalization processes (stage 304) that produce canonical form(s) that are stored in metadata storage 210. Note that the raw metadata is also stored in metadata storage 210, as indicated by data flow stage 306. As described, the inventive system may also perform additional background and/or real-time processing of the metadata and/or canonical forms, with this processing performed by element 212 and represented by data flow stage 308. The updated or further processed data is stored in metadata storage 210, as represented by data flow stage 310. A user 220 may request data or perform some operation that produces data for display to the user (as represented by data flow stage 312), for example, by entering a request or search into a user interface associated with presentation system 216. In response, presentation system 216 may generate a display or message for user 220 to view or otherwise access the returned metadata 314 and/or the results of some operation that used such metadata (e.g., search results, recommendations based on the metadata, comparison of play lists or content libraries belonging to different members of a network or group, etc.).

As has been described, the inventive system processes raw metadata used to describe or otherwise characterize content into a canonical form and then maps that canonical form back to a "preferred", "best", or "correct" form of input metadata. As will be understood, in the course of processing multiple instances of raw metadata, even if those metadata are intended to refer to the same content, more than one canonical form may be generated. This means that each canonical form may map back to a different "preferred", "best", or "correct" form of input metadata. And, as a result of the possibility of multiple canonical forms being generated from raw metadata that is intended to refer to the same content, incorrect or ambiguous metadata may still end up being used in some applications. In recognition of this possibility, the inventive system further includes additional processing operations intended to reduce ambiguity, correct spelling, and otherwise provide a more optimal process of identifying the appropriate metadata to use in a specific application or use case (as has been referred to with reference to FIGS. 2 and 3).

Figure 4:
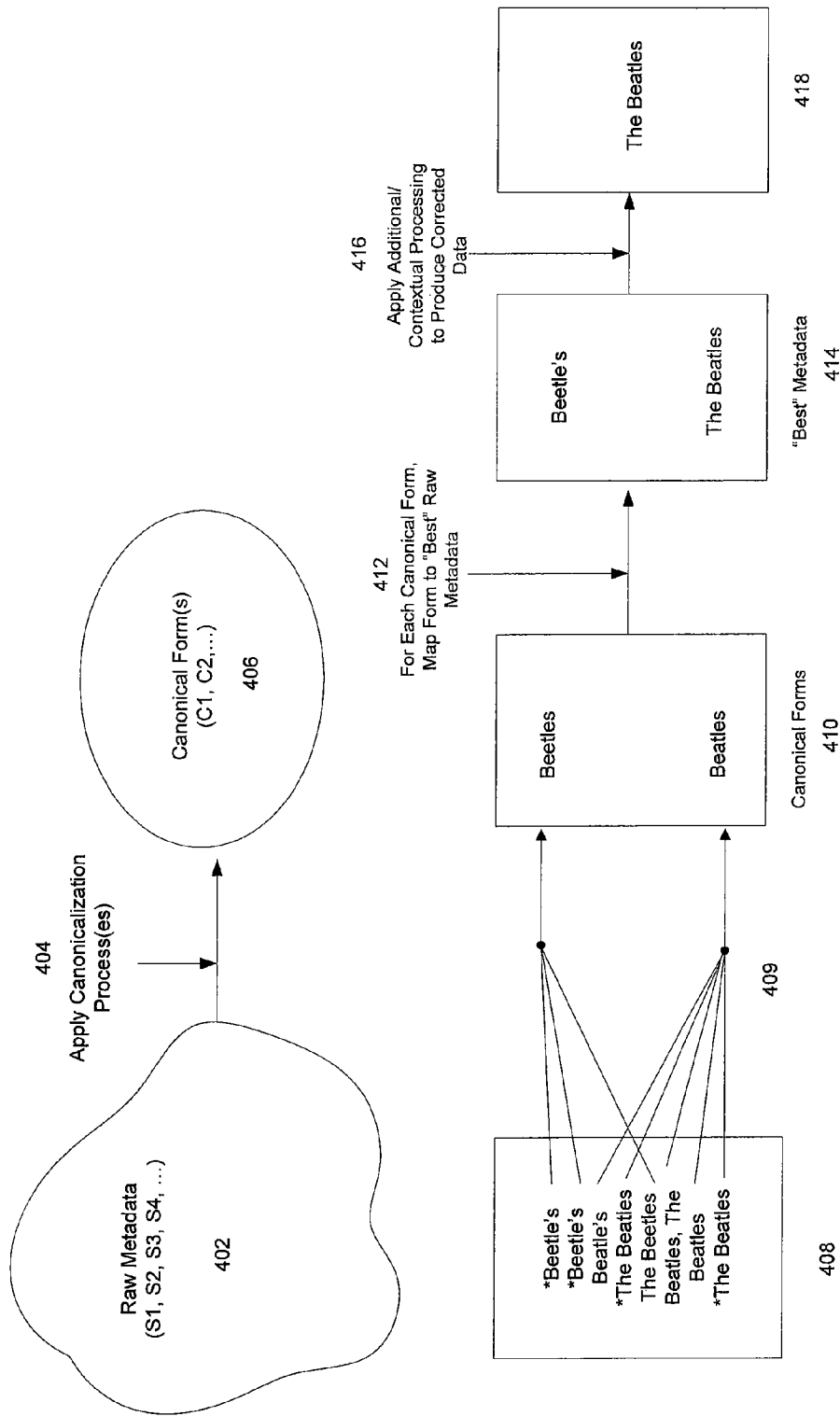
FIG. 4 is a diagram illustrating a conceptual overview of certain of the metadata processing operations that may be used to reduce errors or ambiguities in metadata used to characterize content in accordance with some embodiments of the present invention.

FIG. 4 is a diagram illustrating a conceptual overview 400 of certain of the metadata processing operations that may be used to reduce errors or ambiguities in metadata used to characterize content in accordance with some embodiments of the present invention. As shown in the figure, the inventive system operates on raw metadata 402 (typically in the form of strings (S1, S2, . . . )) by the application of canonicalization processes 404 to produce one or more canonical forms (C1, C2, . . . ) 406. As shown in the figure, an example of such raw metadata might be the name of an artist for a musical track 408, where the artist name may take a plurality of forms. By application of the canonicalization process or processes 409, the raw metadata input may be reduced or converted to canonical forms 410 of the form shown in the figure. In the example shown, note that certain of the input metadata strings for the artist's name have been mapped to, or associated with the canonical form "Beetles", while others have been mapped to, or associated with the form "Beatles".

In the example depicted in FIG. 4, the canonicalization process removes leading or trailing articles (e.g., "The") and apostrophes to generate a canonical form. Next, as has been described, the system maps or associates each canonical form with the form of input metadata which represents the "preferred", "best", or "correct" metadata that has been processed to produce the canonical form 412 (as indicated by an asterisk representing the most "popular" form of the example input data). The result is a mapping or associating of input data 408 to one or more canonical forms 410 and then to a "preferred", "best", or "correct" form of metadata for that information 414, via the intermediary of a canonical form. In the example shown in FIG. 4, there are two canonical forms ("Beetles" and "Beatles") and two corresponding "preferred", "best", or "correct" forms of input metadata ("Beetle's" and "The Beatles").

As mentioned, as the number of sources of input metadata increases, so too may the number of possible variations in the form of the input metadata and canonical forms produced by the inventive system. In some instances these canonical forms may represent the same information, and it is desirable to introduce processes, rules, heuristics, or other forms of knowledge that may be used to determine if the set of input data or generated canonical forms may be simplified or reduced. As will be described, one method of correcting errors in metadata or reducing the set of possible canonical forms is to apply one or more of contextual knowledge, spell checking, or other processes to the metadata or set of canonical forms, as indicated by process 416 in the figure. In the example shown in the figure, such additional processing acted to reduce the number of canonical forms or raw metadata and produce the single output "The Beatles" 418, which in this case represents the preferable form of the metadata describing the artist for the musical track being considered. Note that although the figure suggests application of the additional processing 416 to the "best" metadata 414, such additional processing may also be applied to raw metadata, canonical forms, or other data. In some embodiments, it may be advantageous to apply the additional processing to a sample of data types (i.e., "best" data, raw metadata, canonical forms, etc.) to determine which, if any, yields preferred results for the desired application. Note that this may depend on the type of additional processing being implemented as well as the format of the data types.

Figure 5:
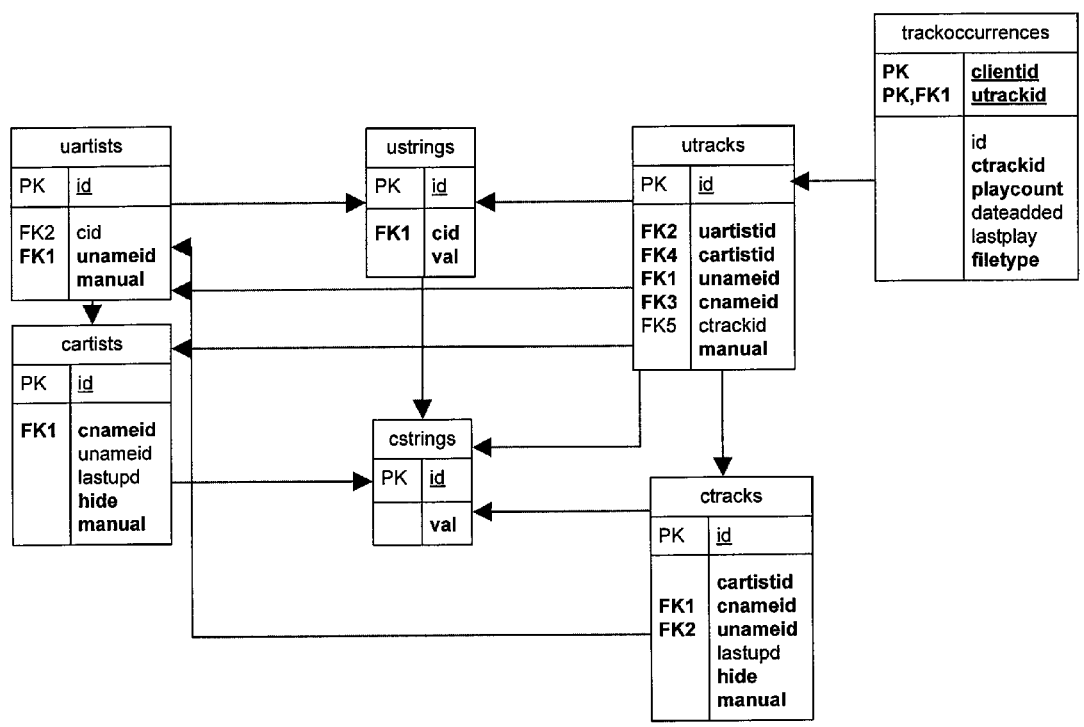
FIG. 5 is a diagram showing an example of a data storage schema that is suitable for use with some embodiments of the present invention.

FIG. 5 is a diagram showing an example of a data storage schema 500 that is suitable for use with some embodiments of the present invention. FIG. 5 represents one possible schema for the storage and organization of the input metadata, resulting canonical form(s) and "preferred" metadata. The data types to be described are defined in legend 502 of the figure. Note that as described in legend 502, the prefix: "u" refers to uncanonicalized/raw data and "c" refers to canonicalized data.

As described, in some implementations of the present invention, two or more sets of metadata may be involved; the 'raw' or un-canonicalized set that includes the raw data provided by users or other sources, and the 'canonical' set of data. The canonical set is typically a smaller set of data due to the operation of the canonicalization algorithm in mapping multiple 'raw' items to a single "canonical" item. Note that in some embodiments, the data stored in the database or other data storage element may have the following characteristics:

- The 'raw' metadata is stored in its input form (in the case of music metadata as an example, refer to the ustrings, uartists, and utracks tables or forms in the database schema);
- The 'canonical' metadata is stored in a separate set of tables or forms (see, for example, cstrings, cartists, and ctracks in the database schema);
- The 'raw' entries point to or are otherwise associated with the corresponding 'canonical' entries obtained by applying the canonicalization process to the raw data;
- Each of the 'canonical' entries points back to, is linked to, or is otherwise associated with the "preferred", "best", etc. form of the one or more 'raw' entries that point to that canonical entry;
- The original 'raw' data can be accessed from the 'raw' tables; and
- To access the cleaned up/corrected/output metadata, the invention accesses the 'canonical' tables but selects the 'best' form from the non-canonical tables.

As an example of the inventive processes and data formats, consider the following: The users are Joe, Sue, Bob, and Mary. They each have slightly different spellings or forms of metadata for the musical content (song) 'Blackbird' by 'The Beatles'—in the example, these result in the following inputs to the system:

<Joe, "The Beatles", "Black Bird">
<Sue, "The Beatles", "Blackbird">
<Bob, "Beatles, The", "blackbird">
<Mary, "beatles", "Blackbird">

The above n-tuples are the data provided by the metadata source or sources 202 in FIG. 2, and represent a user or data provider name, artist name, and song or track name. The example data will result in the following data in the schema described with reference to FIG. 5 during the initial data import:

| Cstrings | |
|---|---|
| id | val (canonical value) |
| 1 | beatles |
| 2 | blackbird |

-continued

| Ustrings | | |
|---|---|---|
| id | cid (id in cstrings) | val (raw value) |
| 1 | 1 | The Beatles |
| 2 | 2 | Black Bird |
| 3 | 2 | Blackbird |
| 4 | 1 | Beatles, The |
| 5 | 2 | blackbird |
| 6 | 1 | beatles |

| Cartists | | |
|---|---|---|
| id | cnameid (id in cstrings) | unameid (id in ustrings) |
| 1 | 1 | 1 |

| Uartists | | |
|---|---|---|
| id | cid (id in cartists) | unameid (id in ustrings) |
| 1 | 1 | 1 |
| 2 | 1 | 4 |
| 3 | 1 | 6 |

| Ctracks | | | |
|---|---|---|---|
| id | cartistid (id in cartists) | cnameid (id of canonical track name in cstrings) | unameid (id of best raw track name in ustrings) |
| 1 | 1 | 2 | 2 |

| Utracks | | | | | |
|---|---|---|---|---|---|
| id | uartistid (id in uartists) | cartistid (id in cartists) | unameid (id of raw track name in ustrings) | cnameid (id of canonical track name in cstrings) | ctrackid (id of matching row in ctracks) |
| 1 | 1 | 1 | 2 | 2 | 1 |
| 2 | 1 | 1 | 3 | 2 | 1 |
| 3 | 2 | 1 | 5 | 2 | 1 |
| 4 | 3 | 1 | 3 | 2 | 1 |

| Trackoccurrences | |
|---|---|
| user | utrackid (id of row in utracks) |
| Joe | 1 |
| Sue | 2 |
| Bob | 3 |
| Mary | 4 |

As described, in some embodiments of the invention, given a set of 'raw' versions of metadata that have been reduced or converted to the same 'canonical' form of metadata, the invention may apply one or more processes, rules, heuristics, or other knowledge to determine which is the "preferred", "best" or "correct" form of the metadata. One suitable type of metric is a social network based popularity measure, as indicated by the number of unique users who have reported a metadata item with a specific 'raw' spelling. In this form of metric, the system considers the most reported item to be the 'best' spelling (or at least the most commonly accepted and hence "correct" to the network of users). Note that other possible metrics include weighing a given user's contribution with some sort of trustworthiness metric, using additional data from multiple 3$^{rd}$ parties to include or exclude possible candidate data, and/or using a combination of multiple factors that contribute to reliability of the data as weighted by the appropriate coefficients.

Assume that the inventive system finds the "best" spelling or form of metadata by using a popularity metric. Notice that in the example given, the system produces one canonical combination of artist and track, based on four raw input versions. The system has one canonical artist with three raw versions. Both Joe and Mary have reported "The Beatles", while the other two spellings have one user each—therefore the most "popular" spelling for the artist is "The Beatles"—so the system would fill in '1' in the unameid field of cartists.

| Cartists | | |
|---|---|---|
| id | cnameid (id in cstrings) | unameid (id in ustrings) |
| 1 | 1 | 1 |

Next, notice that Sue and Mary have both reported "Blackbird" as the track name, while the other two spellings each have one user reporting them. Therefore the most popular spelling for the track name is "Blackbird", and the system will change the unameid field in ctracks to '3', resulting in:

| Ctracks | | | |
|---|---|---|---|
| id | cartistid (id in cartists) | cnameid (id of canonical track name in cstrings) | unameid (id of best raw track name in ustrings) |
| 1 | 1 | 2 | 3 |

The inventive system now has produced a cleaned or corrected set of metadata for the song track—and the "preferred" or "best" spelling is "Blackbird" by "The Beatles".

Note that although the example describes the use of data tables, fields, and pointers as part of a structured database, other data storage structures, formats and schema may be used in implementing some embodiments of the invention. Such other structures, formats and schema include, but are not limited to, in-memory structures, XML representations, file-system storage, flat-file relational databases, and the storage of data as strings that are operated upon at runtime.

As mentioned with regards to FIGS. 2-4, in some situations it may be desirable to process the raw metadata and/or canonical forms further to reduce ambiguities, correct spelling, or otherwise introduce contextual or other knowledge about the data or system in an effort to improve the quality, accuracy, or utility of the data. In some embodiments, such processing would be intended to improve the results that may be obtained when using the metadata for search, content retrieval, recommendations, generating or comparing play lists, or other services. Note that such additional processing may be performed in real-time as raw data is input, in single processing or batch mode, as part of a background process, or in any other suitable manner. The additional processing may be desirable because the processes described previously may not be sufficient to clean up or correct metadata, or sufficiently reduce ambiguities in cases of misspellings, collaborations, and other formats that may be common in the metadata used to describe content in the libraries of users.

For example, even if two 'raw' metadata items do not map to the same 'canonical' item using some of the processes described, those items may still refer to the same content and it would be desirable to map them to the same 'canonical' item to improve the accuracy and utility of certain services or functions. Specific examples include artists using multiple pseudonyms, misspellings in the metadata, and collaborations between artists that would preferably be attributed to one or both of the artists instead of to a third collaborative entity. Note that the additional data processing to be described may be applied to the data as an additional step or as part of one of the preceding metadata or canonical form processes. Further, in cases where the additional processing suggests that a correction needs to be applied, the system may be configured to ignore the result of the standard 'canonicalization' algorithm and permit the manual mapping or association of selected the 'raw' metadata to the correct, preferred, or desired 'canonical' form (where in the case of metadata processing, the correct, preferred, or desired canonical form is that form associated with the corrected raw metadata found through the additional processing).

As an example, in some embodiments, the inventive system may include a process or processes for correcting misspellings in raw metadata and/or canonical forms. This process or processes may be made more effective by incorporating information about the metadata or canonical forms and the underlying content into the data processing. For example, in the case of artist and song name metadata, by introducing contextual knowledge regarding the types of data, the inventive system can detect and automatically correct some misspellings in artist and track names, and map the 'raw' metadata containing misspellings to the correct 'canonical' form using a process such as the following:

For each artist name or string in the canonical forms of the metadata (preferably starting with a popular artist, the most popular artist, or a known correct artist spelling), the system may search for other, less popular artists in the canonical forms having a name that is spelled closely or similarly to the selected artist. The close or similarly-spelled artists may then be considered "potential matches" for the selected artist. In some embodiments, spelling-similarity can be determined using an algorithm such as the Levenshtein Edit Distance algorithm, or other suitable method. Note that although in this example the edit distance determination or other method is applied between pairs of canonical forms, in some embodiments, it may be applied to the 'raw' metadata spellings; and Given a set of "potential" matches for the selected artist's name, the inventive system and processes may then filter the set to reduce the data that is a candidate for further processing to those "potential" matches that are "sufficiently" less popular than the selected artist used to generate the "potential" matches. This filtering stage not only reduces the data processing involved, but implicitly takes into account the observation or expectation that the popular forms of metadata are the most likely to be correct (so that only sufficiently less popular forms are likely to be incorrect).

For all the artists that are a "potential match" for the correctly spelled or accepted canonical artist name and which are sufficiently less popular than that form, the process then introduces contextual knowledge by comparing the songs that are labeled as belonging to each. The use of such contextual knowledge is based on the recognition of a relationship between an artist and the songs attributed to that artist. In this case the relationship implies a greater confidence level in the accuracy of the 'match" if there is a strong correlation between the songs attributed to the potential match and the selected artist. If a sufficient proportion of the songs by a given potentially-matching artist are exact (or sufficiently close) matches of songs attributed to the selected artist (i.e., the known correct or most popular and hence assumed to be correctly named artist), then that potentially-matching artist is considered to be the same as the selected artist. This outcome is implemented by re-mapping, pointing, linking, or otherwise associating all non-canonical (i.e., raw metadata) forms that were processed to produce the "potential match" canonical form to the selected (and assumed correct) canonical form. Note that other forms of contextual knowledge, expert knowledge, associations, correlations, and relationships may also be introduced to the processing of metadata or canonical forms in order to improve the accuracy, quality, and utility of the data.

Another form of processing that may be applied to the song metadata (as opposed to the artist canonical forms as described previously) will also be described. For songs by an artist (as expressed in raw metadata format) that are mapped to a 'canonical' artist form, the inventive system may determine those songs associated with the raw metadata artist that have names that are spelled similarly or sufficiently closely (again using an algorithm such as the Levenshetin Edit Distance or other suitable method) to those of the canonical artist. If the "potentially equivalent" song names by such artists are sufficiently close in edit distance to those of the canonical artist, then the song names are deemed to be alternate spellings of each other, and are mapped to be equivalent to each other. This outcome may be implemented by re-mapping, pointing, linking, or otherwise associating all non-canonical (i.e., raw metadata) forms for the song names to the canonical form9s) for those song names.

As mentioned, the spell correction process or processes may be applied to raw metadata or to canonical forms. If applied to raw metadata, the incorrect data may be linked, pointed to, mapped, or otherwise associated with the canonical form associated with the desired form of the metadata. Similarly, if the spell correction is performed on the canonical forms, then a pointer or other reference or association may be established between the raw metadata that resulted in the "incorrect" form and the "correct" or desired canonical form.

Figure 6:
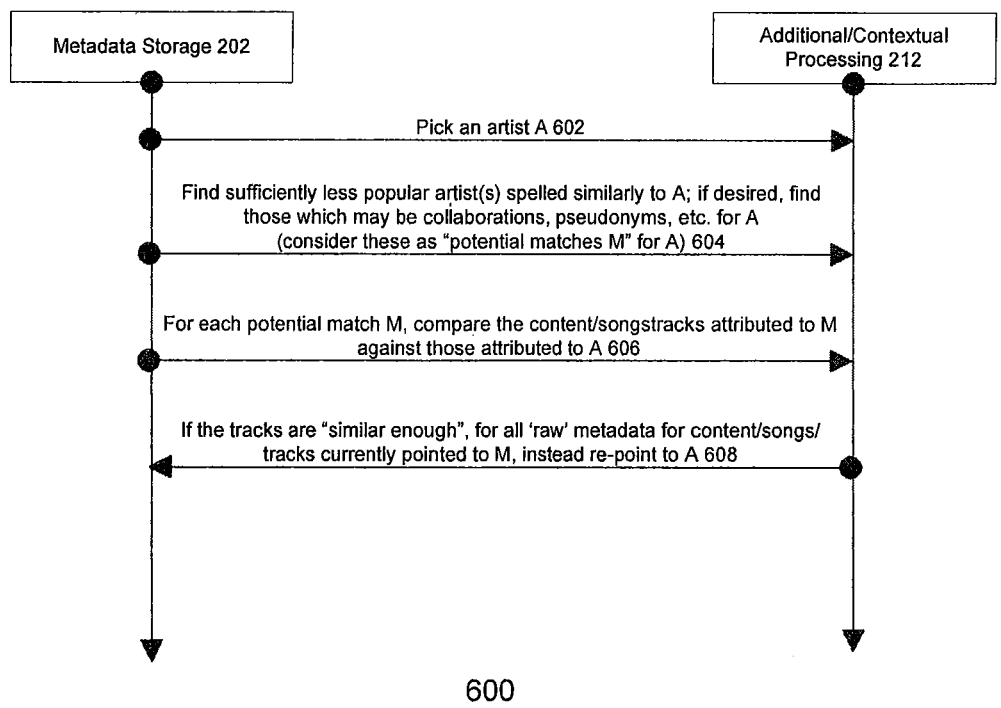
FIG. 6 is a diagram illustrating the data flow for a spelling correction process that may be applied to metadata or canonical forms in accordance with some embodiments of the present invention.

FIG. 6 is a diagram illustrating the data flow 600 for a spelling correction process that may be applied to metadata or canonical forms in accordance with some embodiments of the present invention. As shown in the figure, the spelling correction process may be implemented by applying additional and/or contextual processing (element 212) to data stored in metadata storage 202. As described, the spelling correction process may be initiated by selecting a popular (or the most popular, or known correct) canonical form for an artist name (stage 602). Next, the process determines a group of less popular artists having names spelled similarly to the selected name. In addition, and in some embodiments, a user may select artists which a user desires to include in the processing by virtue of user knowledge about the artists or metadata (such as possible collaborations, pseudonyms, related artists, etc.), as shown in stage 604. The set or group of such artists are considered to be "potential matches M" for the selected artist.

Next, for each potential matching artist, the process compares the content/song titles/track data attributed to each potential match against the similar data or information (e.g., song titles) attributed to the selected artist (stage 606). If the song titles attributed to the potential match are close enough, have enough in common, or satisfy a desired metric, then the artists are considered to be the same and the raw metadata data for the potential artist is linked to, pointed to, mapped, or otherwise associated with the selected artist (stage 608). This causes all raw metadata for the potential artist to be mapped to the selected artist (typically by pointing, linking or otherwise associating the metadata for the potential match to the canonical form or forms associated with the selected artist).

In addition to correcting misspellings, the inventive system may also include a process or processes for separating or otherwise dealing with potential collaborations and attributing the collaborative content to one or more artists. Collaborations between artists are common, and are often described as "Eminem feat. Dido", "Eminem (Dido)", "Eminem and Dido", etc. As recognized by the inventors, another method of improving the metadata used to describe or characterize content is to detect indicia of collaborations (such as the 'featuring' string), split the collaborative name into the composite artists, and match the composite names against an existing artist database. If both of the composite names match a known artist, then the track can be attributed to either one or more of the collaborating artists (as opposed to attributing the content to a new, different artist), either manually or by execution of an automated process.

Further, the inventive system may also be used to map one or more pseudonyms of an artist to a desired form of the artist's name in the metadata. As recognized by the inventors, some artists perform under multiple names. Note that in certain of these cases the system may require a manual mapping of the multiple 'raw' versions to the single correct 'canonical' version (i.e., the canonical version associated with the proper form of the data). Note that as mentioned, the processes described with reference to the figures may be modified or supplemented by manual linking or other association of multiple raw spellings of metadata to one "best" version, via the intermediary of a canonical form (to which the incorrect data is pointed or mapped).

Figure 7:
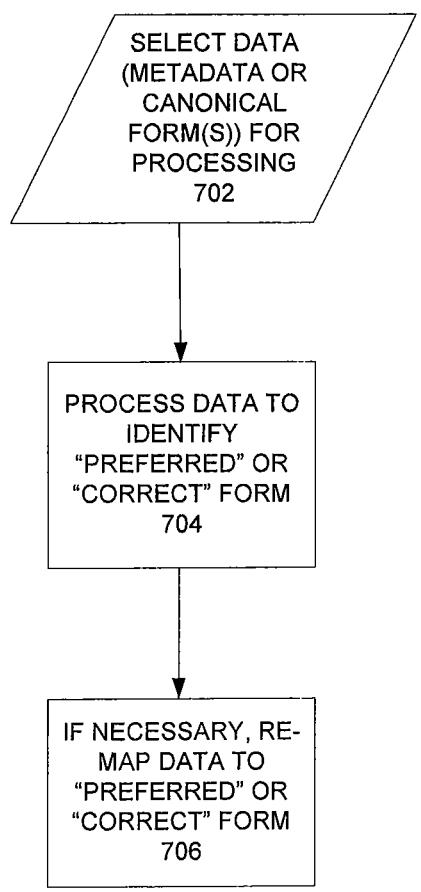
FIG. 7 is a flowchart illustrating a method or process for performing additional processing on metadata or canonical forms that may be used in some embodiments of the present invention to correct misspellings, properly attribute collaborations, account for pseudonyms, or perform other desired data processing to correct data and reduce ambiguities.

FIG. 7 is a flowchart illustrating a method or process for performing additional processing on metadata or canonical forms that may be used in some embodiments of the present invention to correct misspellings, properly attribute collaborations, account for pseudonyms, or perform other desired data processing to correct data and reduce ambiguities. As shown in the figure, the additional processing may be initiated by selecting the data for processing (stage 702). The selected data may be raw metadata or canonical form(s). In the case of selecting a canonical form, the form selected will typically be one that is known to be correct or sufficiently popular to be believed to be the commonly accepted form.

Next, at stage 704, the selected data is processed to identify the "preferred', "correct", or otherwise desired form of the data. This processing may take the form of spelling corrections, filtering based on application of contextual knowledge, determination of a relevant metric, or other suitable form of introducing relevant information regarding the data, data types, relationships between data or data types, or reliability of the data (based on for example, social network derived valuations). A goal of the processing performed at stage 704 is to determine (in some sense) better, more accurate, more likely correct, or otherwise preferable forms of the processed data. After such determination, the less preferable forms of raw metadata, canonical form(s) or both may be re-mapped (that is, be correctly associated, linked to, pointed to, etc.) the preferred form(s) (as indicated by stage 706).

Figure 8:
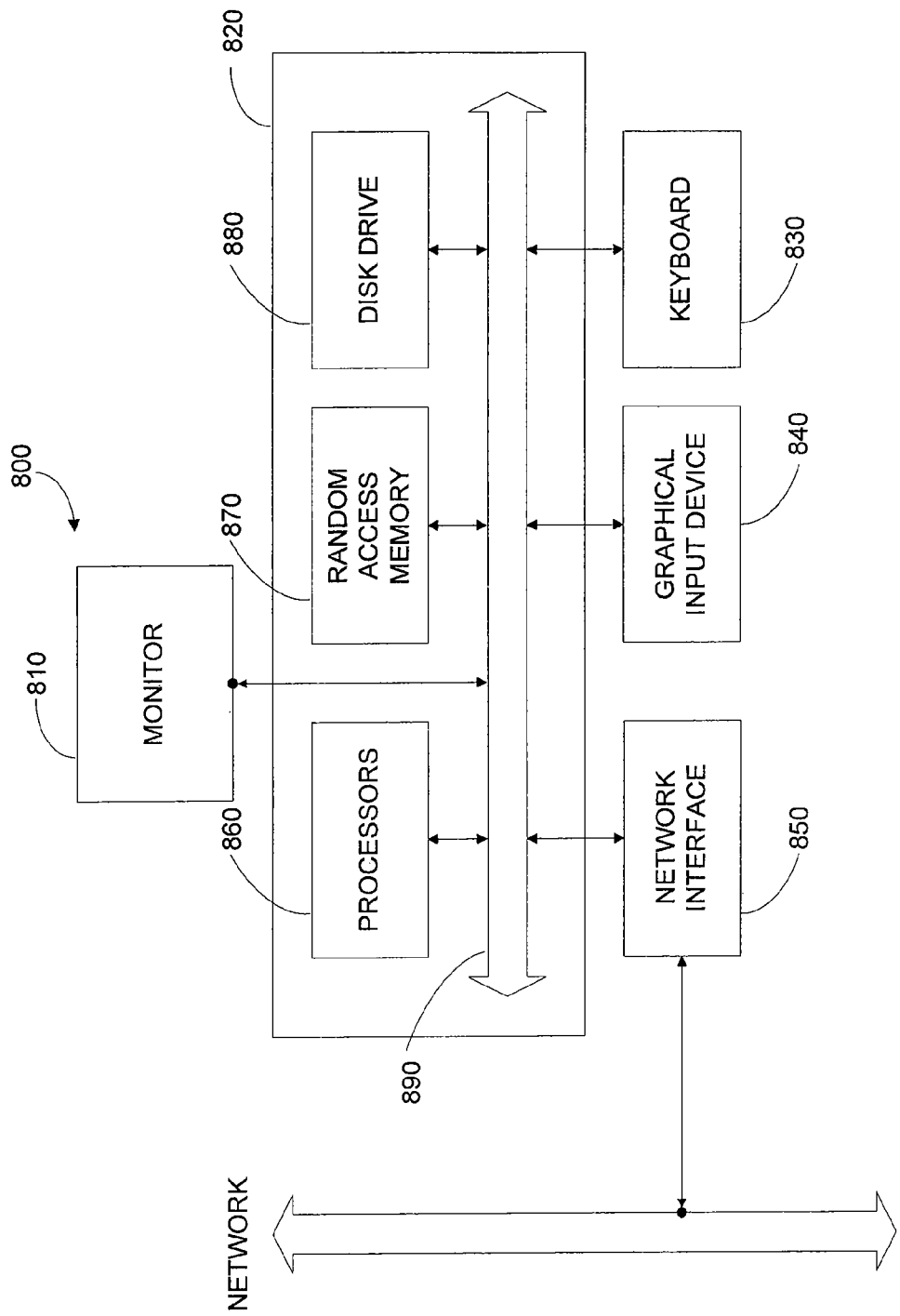
FIG. 8 is a diagram illustrating a representative computer system capable of embodying the present invention.

As mentioned, the inventive system, apparatus, and methods may be implemented in several forms or architectures. Such forms or architectures include, but are not limited to, local processors or computing devices, remote processors or servers connected to data sources over a network or networks, wirelessly connected computing devices, etc. As an example, FIG. 8 is a block diagram of a typical computer system 800 that may be used to implement some embodiments of the present invention. In one embodiment, computer system 800 typically includes a monitor 810, computer 820, a keyboard 830, a user input device 840, computer interfaces 850, and the like.

In one embodiment, user input device 840 is typically embodied as a computer mouse, a trackball, a track pad, a joystick, wireless remote, drawing tablet, voice command system, eye tracking system, and the like. User input device 840 typically allows a user to select objects, icons, text and the like that appear on the monitor 810 via a command such as a click of a button or the like.

Embodiments of computer interfaces 850 typically include an Ethernet card, a modem (telephone, satellite, cable, ISDN), (asynchronous) digital subscriber line (DSL) unit, FireWire interface, USB interface, and the like. For example, computer interfaces 850 may be coupled to a computer network, to a FireWire bus, or the like. In other embodiments, computer interfaces 850 may be physically integrated on the motherboard of computer 820, may be a software program, such as soft DSL, or the like.

In various embodiments, computer 820 typically includes familiar computer components such as a processor 860, and memory storage devices, such as a random access memory (RAM) 870, disk drives 880, and system bus 890 interconnecting the above components. In one embodiment, computer 820 includes one or more Xeon microprocessors from Intel. Further, in one embodiment, computer 820 typically includes a UNIX-based operating system.

RAM 870 and disk drive 880 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In some embodiments, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 8 is a diagram illustrating a representative computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. graphics processor unit).

The processes and systems described herein not only increase the accuracy and utility of certain applications (e.g., search, content retrieval), but also enable the provision of value enhancing services that would not be possible or could not be delivered in a satisfactory manner without the inventive methods and system. Such applications include, but are not limited to:

Comparing the music libraries of users—taking advantage of the system and processes described herein, when comparing the music libraries of two users, the raw metadata is mapped to the "preferred", "best", or "correct" data to display only the proper data. By this means, a song or artist name may be misspelled in either or both users' libraries, however all are mapped to their "correct" spellings and then compared, insuring a more proper calculation of "artists in common" or "songs owned by User A that User B doesn't have", or other functions;

Determining an artist's songs that a user does not have but that are contained in a $3^{rd}$ party library or database (such as a discography). When viewing the songs by an artist, a display of "songs I do not have" will likely only show proper results if the "correct" metadata for the user's music library is compared to the "correct" metadata for the artist's discography. Again, for the purpose of comparison, the raw metadata in a user's library should be mapped to the "correct" metadata before the comparison, after which this query may be performed with more accurate and useful results; and When sharing play lists, typically a play list consumer hopes to recreate the play list provided by a play list publisher. Taking advantage of the system and processes described herein, when the original published play list is displayed, all raw metadata may be mapped to the correct spellings. When trying to match the songs in this play list to the music library of the play list consumer, the raw metadata spellings in the library of the consumer are likewise mapped to their correct spellings. By comparing the "correct" spellings, there is a higher likelihood of finding the matches for songs in the published play list that are already owned by the consumer, and these may then be organized into a matching play list in the consumers library.

Further details of certain of the above-described applications of the present invention, as well as additional description of a social music discovery network in which such applications may be utilized are described in U.S. patent application Ser. No. 11/511,684, entitled "System, Apparatus, and Method for Discovery of Music Within a Social Network", filed Aug. 28, 2006, the contents of which is hereby incorporated by reference for all purposes.

In accordance with the present invention there have been described a system, apparatus, and methods for processing metadata used to characterize content such as images, videos, music, books, etc. The inventive system and processing methods can be used to correct or otherwise reduce errors or ambiguities in the metadata and as a result provide improvements to existing services as well as new services and applications. In some embodiments, the present invention includes using a set of rules, heuristics, or algorithms to determine which of a plurality of strings of data found in metadata are intended to characterize the same real content or item. In some embodiments the inventive method may then use popularity metrics obtained from social networking application(s) to determine which of the available spellings is the "best", "correct" or "preferred" form of the metadata.

The present invention provides many benefits or advantages over present approaches to correcting or resolving ambiguities in metadata used to characterize content. These include, but are not limited to:

When using the inventive system, there is no need to purchase one or more "correct metadata" databases to compare raw metadata to. The system automatically calculates the mapping between raw metadata, and picks the appropriate "known good" spelling based on popularity or another metric. By avoiding purchasing a "correct metadata" database, use of the invention saves money, eliminates the need for regular "freshening" of the data, instead relying on data provided by consumers who contribute their raw metadata to the system;

Most approaches that involve a "known good" purchased database also require (a) merging and interlinking data across multiple data providers, (b) dealing with frequent updates from these data providers, and (c) correcting errors by the data providers. The present invention eliminates the need for such complications and possible sources of error; and Because the inventive system inherently maps multiple "raw" spellings to one "correct" spelling, it's relatively easy to change its operation if one discovers a spelling error, or a change in the correct spelling of an artist or song. The "raw" spellings may then be re-mapped to a different spelling, because the original spellings and metadata are maintained in the system.

It should be understood that certain elements of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of processing a plurality of metadata used to characterize content, comprising:
    accessing a first plurality of raw metadata;
    processing the first plurality of raw metadata to produce a first canonical form, wherein:
        based on the processing, multiple raw metadata of the first plurality of raw metadata are mapped to the same first canonical form; and
        each of the multiple raw metadata mapped to the same first canonical form has an associated metric value, wherein the metric value comprises one or more of a frequency of occurrence metric, a network popularity metric, or a social networking reliability metric;

comparing the associated metric value of each of the multiple raw metadata to identify the raw metadata having the highest metric value as the preferred metadata form;
generating an additional mapping that maps the first canonical form back to the preferred metadata form;
receiving a request for a data processing operation that includes a first raw metadata of the multiple raw metadata that maps to the same first canonical form, wherein the first raw metadata is different from the preferred metadata form; and
utilizing the preferred metadata form as an input in the data processing operation instead of the first raw metadata based on the mappings.

2. The method of claim 1, wherein the content is one or more of the following:
an image;
a song;
a video; and
an electronic book.

3. The method of claim 1, wherein the first plurality of raw metadata comprise a plurality of strings of data, the strings of data including alphanumeric characters, and processing the first plurality of raw metadata to produce the first canonical form further comprises performing one or more of:
removing a character from a string of data; and
replacing a character in a string of data with a different character.

4. The method of claim 1, wherein the associated metric value further comprises one or more of the following:
popularity of the first plurality of raw metadata among members of a group;
frequency of usage of the first plurality of raw metadata among members of the group; and
an indicia of validity of the first plurality of raw metadata based on a characteristic of a member of the group.

5. The method of claim 4, wherein the group is a social network.

6. The method of claim 4, wherein the characteristic of the member of the group is a reputation of the member.

7. The method of claim 1, wherein utilizing the associated raw metadata as an input in the data processing operation further comprises using the associated raw metadata in one or more of the following operations:
performing a search for content;
retrieving content;
generating a recommendation of content for a user; and
comparing content between a first and second user.

8. The method of claim 1, wherein the plurality of raw metadata further comprises one or more of data describing:
an author of content;
an artist;
a title of content;
a creator of content; and
a description of content.

9. The method of claim 1, further comprising:
accessing a second plurality of raw metadata;
processing the second plurality of raw metadata to produce a second canonical form;
processing the first and second canonical forms to determine if the first and second canonical forms represent the same content; and
if it is determined that the first and second canonical forms represent the same content, then associating the second plurality of raw metadata with the first canonical form.

10. The method of claim 9, wherein processing the first and second canonical forms to determine if the first and second canonical forms represent the same content further comprises performing a spelling correction process on the second canonical form.

11. The method of claim 10, wherein performing a spelling correction process on the second canonical form further comprises determining a similarity or difference measure between the first and second canonical forms.

12. The method of claim 9, wherein processing the first and second canonical forms to determine if the first and second canonical forms represent the same content further comprises using contextual information about the first and second plurality of raw metadata to determine if the first and second canonical forms represent the same content.

13. A method of searching for an item of content, the item of content being associated with one or more elements of metadata, comprising:
receiving raw metadata associated with the item of content;
processing the received raw metadata to produce a canonical form, wherein:
based on the processing of the raw metadata and other raw metadata, multiple raw metadata are mapped to the same canonical form; and
each of the multiple raw metadata mapped to the same canonical form has an associated metric value, wherein the metric value comprises one or more of a frequency of occurrence metric, a network popularity metric, or a social networking reliability metric;
comparing the associated metric value of each of the multiple raw metadata to identify the raw metadata having the highest metric value as the preferred metadata form;
generating an additional mapping that maps the same canonical form back to the preferred metadata form;
receiving a request for a search process that includes a first raw metadata of the multiple raw metadata, wherein the first raw metadata is different from the preferred metadata form; and
utilizing the preferred metadata form as an input in the search process instead of using the first raw metadata based on the mappings.

14. The method of claim 13, wherein the item of content is one or more of the following:
an image;
a song;
a video; and
an electronic book.

15. The method of claim 13, wherein the raw metadata comprise one or more strings of data, the strings of data including alphanumeric characters, and processing the received raw metadata to produce the canonical form further comprises performing one or more of:
removing a character from a string of data; and
replacing a character in a string of data with a different character.

16. The method of claim 13, wherein the associated metric value further comprises one or more of the following:
popularity of the multiple raw metadata among members of a group;
frequency of usage of the multiple raw metadata among members of the group; and
an indicia of validity of the multiple raw metadata based on a characteristic of a member of the group.

17. An apparatus for processing a plurality of raw metadata used to characterize content, comprising:
a processor configured to execute a set of instructions;
a data store configured to store the raw metadata; and an instruction store configured to store the set of instructions, wherein when executed by the processor, the set of instructions implements a process to:
access the plurality of raw metadata;
process the plurality of metadata to produce a canonical form, wherein:
based on the process, multiple raw metadata of the plurality of raw metadata are mapped to the same canonical form; and
each of the multiple raw metadata mapped to the same canonical form has an associated metric value, wherein the metric value comprises one or more of a frequency of occurrence metric, a network popularity metric, or a social networking reliability metric;
compare the associated metric value of each of the multiple raw metadata to identify the raw metadata having the highest metric value as as the preferred metadata form;
generate an additional mapping that maps the same canonical form back to the preferred metadata form;
receive a request for a data processing operation that includes a first raw metadata of the multiple raw metadata that maps to the same canonical form, wherein the first raw metadata is different from the preferred metadata form; and
utilize the preferred metadata form as an input in the data processing operation instead of the first raw metadata based on the mappings.

18. The apparatus of claim 17, wherein the content is one or more of the following:
an image;
a song;
a video; and
an electronic book.

19. The apparatus of claim 17, wherein the associated metric value further comprises one or more of the following:
popularity of the plurality of raw metadata among members of a group;
frequency of usage of the plurality of raw metadata among members of the group; and
an indicia of validity of the plurality of raw metadata based on a characteristic of a member of the group.

20. The apparatus of claim 17, wherein utilizing the one of the plurality of raw metadata as an input in the data processing operation further comprises using the one of the plurality of raw metadata in one or more of the following operations:
performing a search for content;
retrieving content;
generating a recommendation of content for a user; and
comparing content between a first and second user.

* * * * *